United States Patent
Oross et al.

(10) Patent No.: US 6,667,881 B2
(45) Date of Patent: Dec. 23, 2003

(54) ALIGNMENT MECHANISM FOR A COMPUTER SYSTEM HAVING A PORTABLE COMPUTER AND A DOCKING STATION

(75) Inventors: Glen A Oross, Corvallis, OR (US); Robert P Bliven, Corvallis, OR (US); Michael D Derocher, Corvallis, OR (US); Masahiko Muranami, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/377,010

(22) Filed: Feb. 27, 2003

(65) Prior Publication Data

US 2003/0147209 A1 Aug. 7, 2003

Related U.S. Application Data

(62) Division of application No. 09/628,230, filed on Jul. 28, 2000, now Pat. No. 6,560,101.

(51) Int. Cl.[7] .................................................. G06F 1/16
(52) U.S. Cl. ...................... 361/686; 361/683; 361/687; D14/434; 439/928; 710/100; 710/303
(58) Field of Search ................................ 361/686, 683, 361/687; 439/341, 376, 142, 372, 928; 710/100, 2, 303, 304; D14/100, 434, 432, 439

(56) References Cited

U.S. PATENT DOCUMENTS

| | | |
|---|---|---|
| 5,704,212 A | 1/1998 | Erler et al. |
| 5,751,546 A | 5/1998 | Clark et al. |
| 5,768,101 A | 6/1998 | Cheng |
| 5,784,253 A | 7/1998 | Ooka et al. |
| 5,805,412 A | 9/1998 | Yanagisawa et al. |
| 5,808,860 A | 9/1998 | Ohgami et al. |
| 5,862,036 A | 1/1999 | Lin |
| 5,933,322 A | 8/1999 | Ruch et al. |
| 5,948,074 A | 9/1999 | Ninomiya |
| 5,969,939 A | 10/1999 | Moss et al. |
| 6,034,869 A | 3/2000 | Lin |
| 6,061,233 A | 5/2000 | Jung |
| 6,084,769 A | 7/2000 | Moore et al. |
| 6,135,801 A | 10/2000 | Helot et al. |
| 6,172,871 B1 | 1/2001 | Holung et al. |
| 6,181,553 B1 | 1/2001 | Cipolla et al. |
| 6,185,095 B1 | 2/2001 | Helot et al. |
| 6,191,943 B1 | 2/2001 | Tracy |

FOREIGN PATENT DOCUMENTS

| | | | |
|---|---|---|---|
| EP | 837386 A1 * | 4/1998 | ............ G06F/1/16 |
| JP | 11-163567 | 6/1999 | |

* cited by examiner

*Primary Examiner*—Lisa Lea-Edmonds
(74) *Attorney, Agent, or Firm*—Curtis G. Rose

(57) ABSTRACT

A docking station for a portable computer contains a platform and a movable guide bar connected to the docking station and extending over the platform. The guide bar is capable of guiding the portable computer into proper alignment with the docking station when the portable computer is placed on the guide bar and pressed downwardly into the platform. The guide bar may contain a thermally conductive guide protrusion capable of mating with a heat sink on the portable computer. Heat is transferred from the heat sink on the portable computer to the guide protrusion on the guide bar. The guide bar itself may also be thermally conductive, providing a further avenue for heat to be transferred from the portable computer to the docking station.

20 Claims, 6 Drawing Sheets

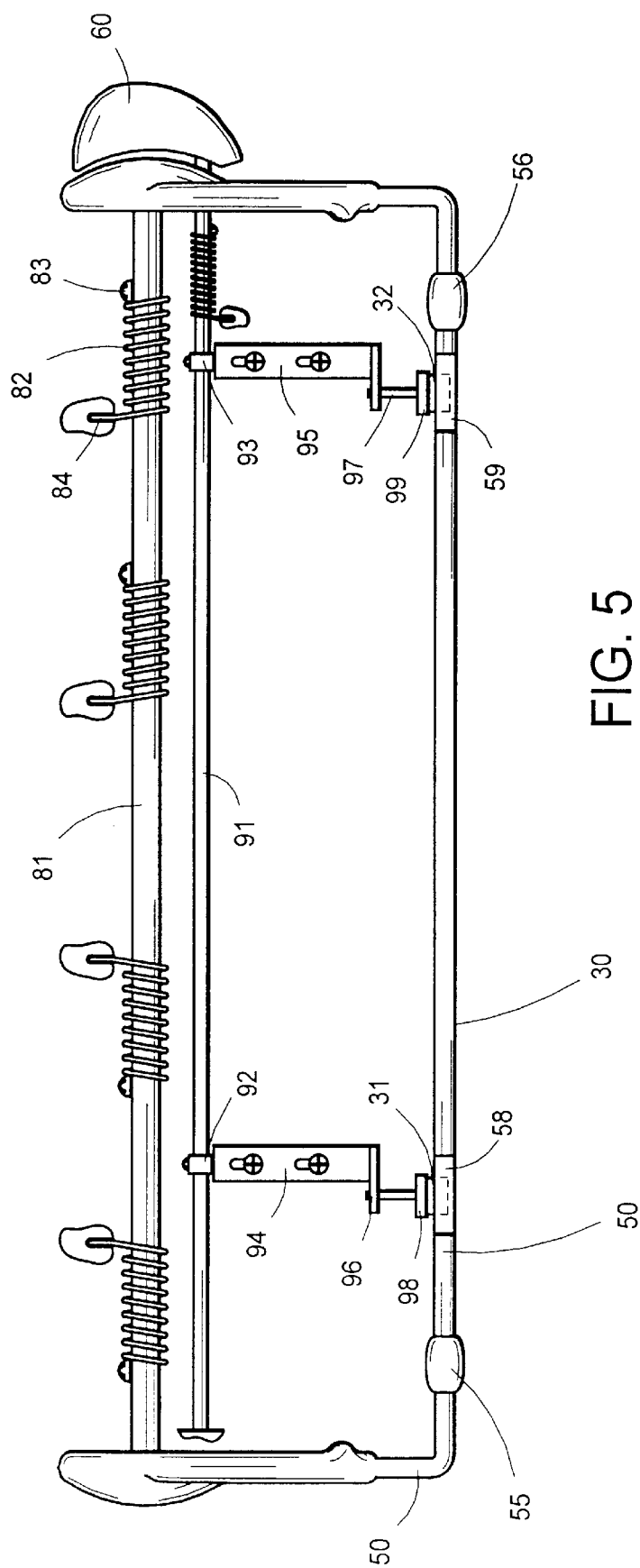
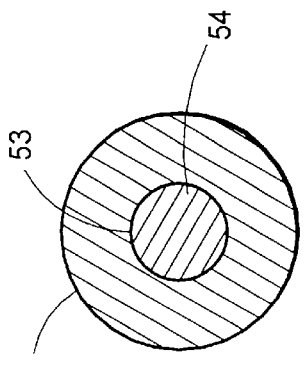
FIG. 5
FIG. 7

ALIGNMENT MECHANISM FOR A COMPUTER SYSTEM HAVING A PORTABLE COMPUTER AND A DOCKING STATION

CROSS REFERENCE TO RELATED APPLICATION(S)

This is a divisional of application Ser. No. 09/628,230 filed on Jul. 28, 2000 now U.S. Pat. No. 6,560,101, which is hereby incorporated by reference herein.

FIELD OF THE INVENTION

This invention relates to the electronics circuitry field. More particularly, this invention is an alignment mechanism for a computer system having a portable computer and a docking station.

BACKGROUND OF THE INVENTION

Portable computers have grown in popularity over the last several years. Despite the fact portable computers are by their nature small, lightweight, and easy to carry from place to place, their capabilities, memory and processing power rivals that of their much larger sibling, the desktop computer. In fact, portable computers are so handy, especially for today's mobile computing professionals, that it is difficult to see why anyone needs a large, bulky desktop computer anymore.

One major drawback of portable computers is their relative inflexibility to easily attach peripherals, such as printers, modems, external speakers, external monitors, external input devices, and the like. If a portable computer is going to truly replace a desktop computer when the user is in his or her office, the quick, easy, flexible attachment of peripherals is important.

More recently, docking stations have been developed for portable computers that allows them to more flexibly attach peripherals. Docking stations vary in complexity from relatively simple manually operated port replicators to more complex mechanically operated full-fledged docking systems. When a portable computer is connected to these docking stations, such as when a user is in his or her office, substantially all of the benefits of a desktop system can be achieved, while maintaining the flexibility the user has to take the portable computer with him or her on the road.

While docking stations have made it possible for portable computers to be true desktop replacements, they are not without their problems. One such problem is the relatively difficult nature of connecting a portable computer to the docking station in the first place. If the docking station does not have a complex mechanical mechanism to assist the user with this docking process, many users will be unable to successfully accomplish the docking process in a repeated manner, and may even damage the docking station, the portable computer, or both. Unfortunately, the existence of a complex mechanical mechanism greatly adds to the cost, size, and weight of the docking station. As the docking station gets bigger, heavier, and more expensive, the benefits of the portable computer and docking station over a desktop computer become less apparent.

Another problem is that the high demands for processing power of a notebook computer, coupled with the small size of the notebook computer, can result in the notebook computer getting quite hot. This problem can be exasperated when the notebook computer is docked in a docking station, since the cover on the notebook computer is typically closed, and the air movement around the notebook computer can be blocked by the docking station. A prior attempt to solve this problem places a fan in the docking station to help cool off the notebook computer when docked. Another attempt simply slows down the processor when it gets too hot. While both of these attempts have some merit, they can be costly in terms of added components in the docking station, reduced capabilities of the portable computer, or both. In either case, the overall expense of the computing system is increased, and again makes the benefits of a portable computer and docking station versus a desktop computer less apparent.

SUMMARY OF THE INVENTION

A docking station for a portable computer contains a platform and a movable guide bar connected to the docking station and extending over the platform. The guide bar is capable of guiding the portable computer into proper alignment with the docking station when the portable computer is placed on the guide bar and pressed downwardly into the platform.

The guide bar may contain a thermally conductive guide protrusion capable of mating with a heat sink on the portable computer. Heat is transferred from the heat sink on the portable computer to the guide protrusion on the guide bar. The guide bar itself may also be thermally conductive, providing a further avenue for heat to be transferred from the portable computer to the docking station.

DESCRIPTION OF THE DRAWINGS

FIG. 5 shows a portion of the docking station of FIG. 1 in more detail.

FIG. 7 shows a cross section of the guide bar of the docking station in an alternate embodiment of the invention.

DETAILED DESCRIPTION

Figure 1:
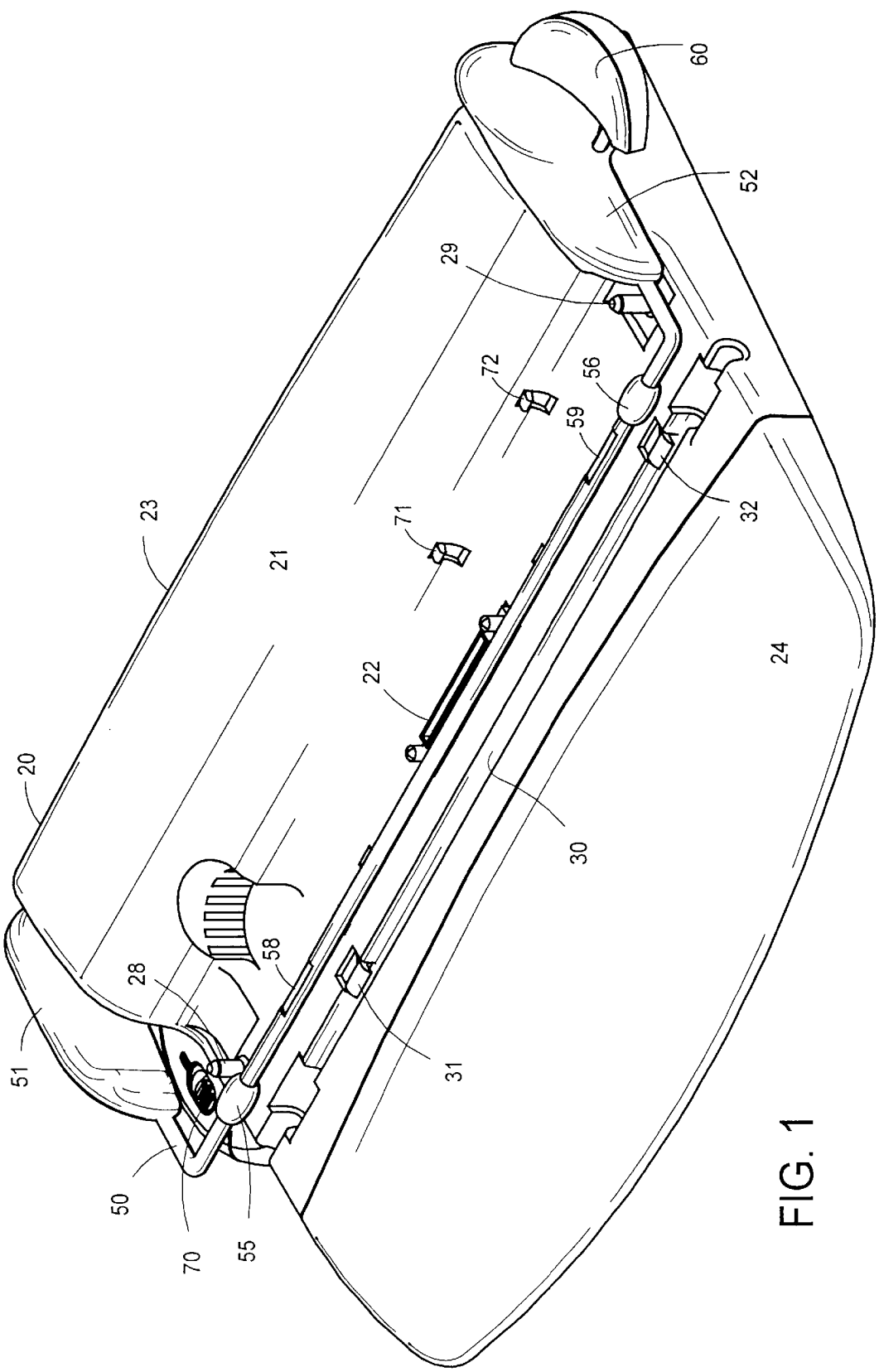
FIG. 1 shows the docking station of the computing system of the preferred embodiment of the invention.

FIG. 1 shows the docking station of the computing system of the preferred embodiment of the invention. Docking station 20 has housing 21 and platform 24. Housing 21 has I/O connectors 23. Platform 24 also contains docking connector 22. Those skilled in the art will appreciate that docking connector 22 could be located differently from that shown in FIG. 1 and still fall within the spirit and scope of the invention.

Docking station 20 also contains guide bar 50. Guide bar 50 contains end portions 51 and 52, guide protrusions 55 and 56, and retention pads 58 and 59. Guide bar 50 is movable between a guiding position extending over platform 24, as is shown in FIG. 1, to a docked position, as is shown in FIGS.

3 and 6, as will be described in more detail later. Details of the mechanism that moves guide bar 50 from a guiding position to a docked position and back again will be described in more detail later in conjunction with the discussion of FIG. 5.

Platform 24 also contains recessed portion 30. Recessed portion 30 provides a place for guide bar 50 when guide bar 50 is in the docked mode. When in the docked mode, guide bar 50 is retained in recessed portion 30 by retention mechanism 31 and 32. Retention mechanism 31 and 32 retain retention pads 58 and 59 on guide bar 50. In the preferred embodiment, guide bar 50 is spring biased in the guiding position, as will be explained in more detail later.

Platform 24 also contains alignment pins 28 and 29. Alignment pins 28 and 29 are capable of mating with alignment apertures on a portable computer when the portable computer is docked in the docking station, as will be described in more detail later.

Docking station 20 also contains on/off switch 70, and grounding pins 71 and 72. On/off switch 70 allows a user to turn the docked portable computer on and off. Grounding pins 71 and 72 contact connectors 171 and 172 on the portable computer (FIG. 2) to provide a ground path for them. These connectors are not used when the docking station docks the portable computer, and ground pins 71 and 72 help reduce the electromagnetic interference of the portable computer when docked.

For purposes of this invention, a "docking station" refers to any device that provides convenient connections for a portable computer at a desktop or other generally fixed location (e.g., office, home, automobile, hotel, airplane, etc.). A docking station is typically connected to one or more of a wide variety of devices, such as a mouse, a printer, a keyboard, a display, a network cable, a telephone cable, speakers, an AC power adapter, a security lock, additional media drives, etc. Once the portable computer is docked with the docking station, it can access the device(s) the docking station is connected to without making additional connections. Those skilled in the art will appreciate that the term "docking station" would include a "full-fledged" motorized docking station, a slice, a port replicator, or other similar devices.

Figure 2:
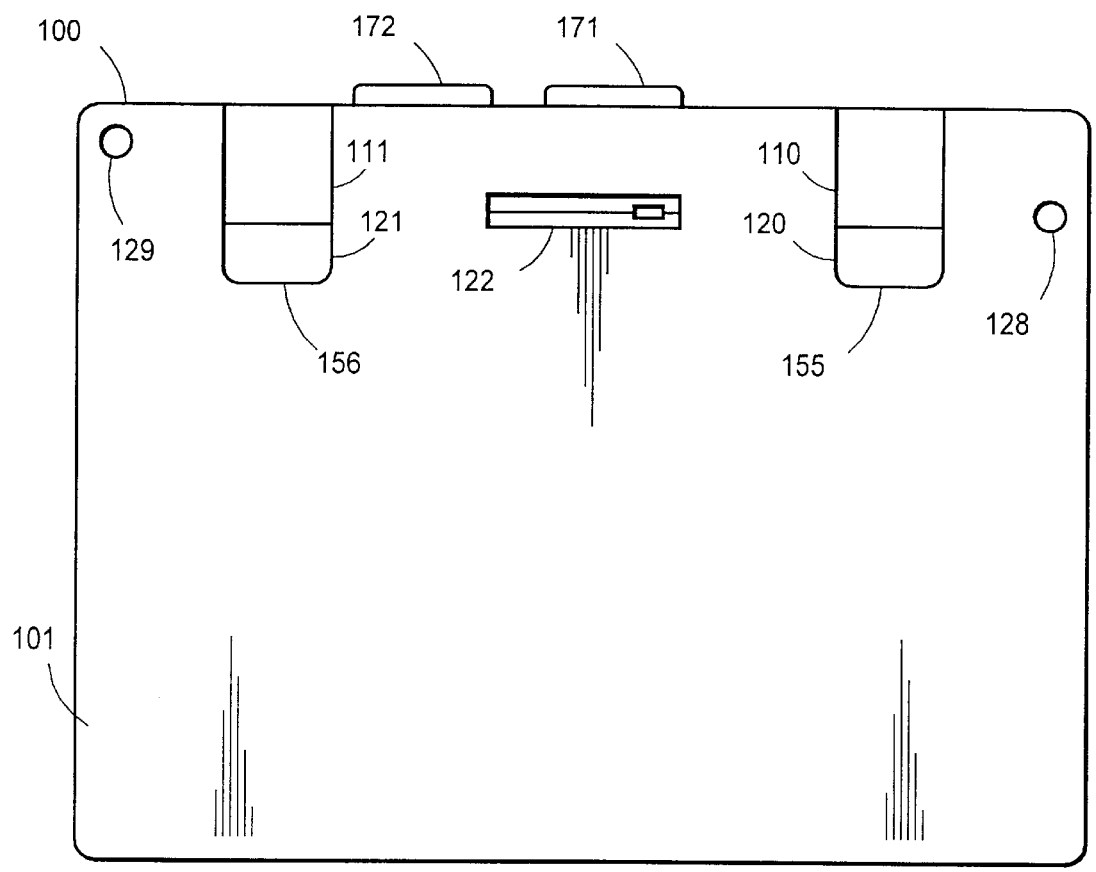
FIG. 2 shows a portion of the portable computer used in the computing system of the preferred embodiment of the invention.

FIG. 2 shows bottom portion 101 of portable computer 100 of the computing system of the preferred embodiment of the invention. Computer connector 122 is preferably located on bottom portion 101 of portable computer 100, those skilled the art will appreciate the computer connector 122 could be located elsewhere. Bottom portion 101 has recessed guide grooves 155 and 156. Guide grooves 155 and 156 allow guide protrusions 55 and 56 to travel into an aligned position. Guide grooves 155 and 156 contain guide portions 110 and 111 respectively, and heat sink portions 120 and 121, respectively. In the preferred embodiment, heat sink portions 120 and 121 are deeper than guide portions 110 and 111. Guide portions 110 and 111 preferably start at or near the service of bottom portion 101 and become gradually more recessed until reaching heat sink portions 120 and 121. Heat sink portions 120 and 121 are preferably coupled thermally to one or more heat producing components within portable computer 100, such as a microprocessor. While two guide portions, heat sink portions, and guide protrusions are shown in FIG. 2, an alternate embodiment has been contemplated where only one of these elements is present. Other alternate embodiments have been contemplated with other numbers of these elements, from zero to three or more.

Bottom portion 101 of portable computer 100 also contains alignment apertures 128 and 129. These apertures are capable of mating with alignment pins 28 in 29 when portable computer 100 is docked with docking station 20, as will be described a more detail later.

Figure 3:
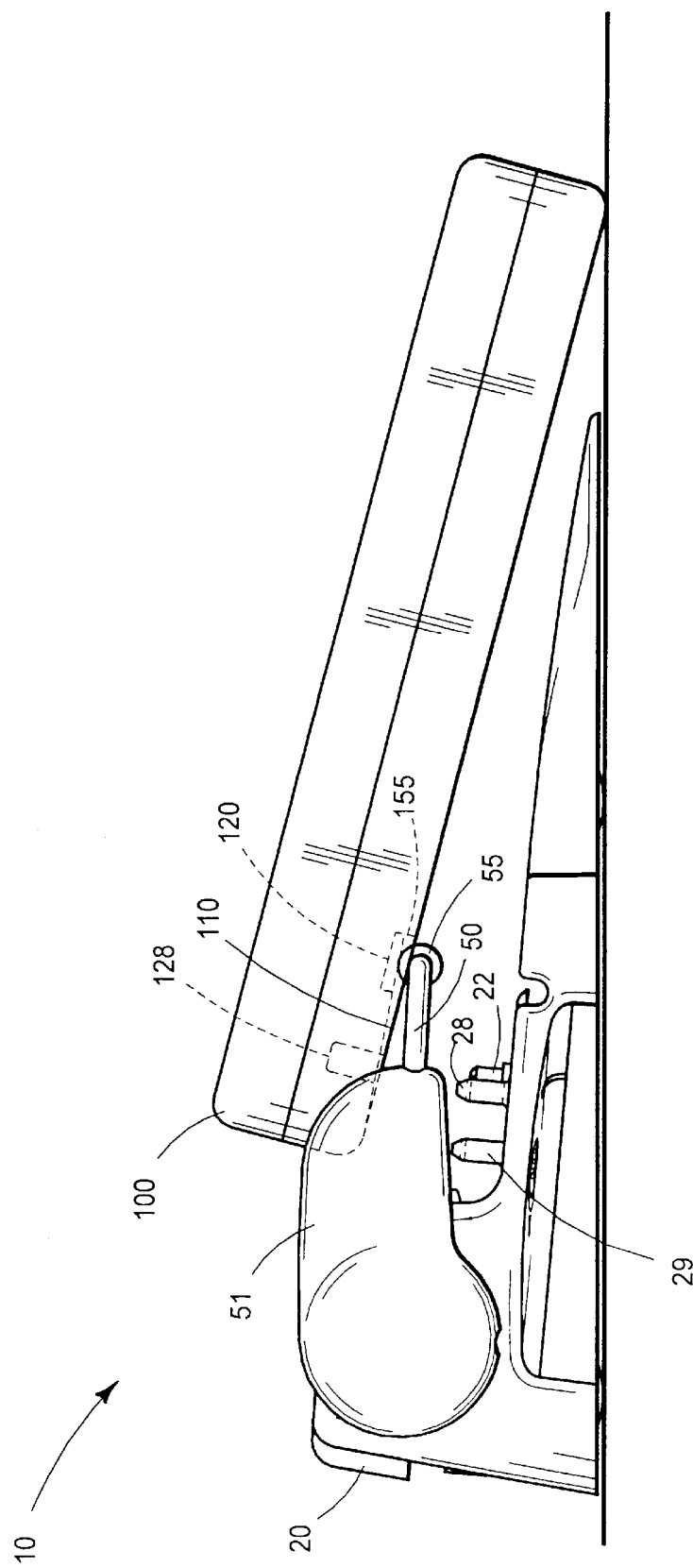
FIG. 3 shows a side view of the docking station of FIG. 1, with a portable computer of the preferred embodiment of the invention resting on the guide bar in the guiding position.

FIG. 3 shows a side view of computer system 10, with portable computer 100 resting on guide bar 50 of docking station 20 in the guiding position. When the user originally puts portable computer 100 on guide bar 50, guide protrusion 56 eventually lands in recessed guide groove 156. If necessary, the user then pushes portable computer 100 forwards until guide protrusion 56 comes to a stop at the end of recessed guide groove 156, as shown in FIG. 3. Note that guide protrusion 56 is proximate to and mates with heat sink 121 in this position. This allows heat sink 121 to conduct heat to guide protrusion 56.

Preferably, guide bar 50 is also thermally conductive, and heat can conduct from guide protrusion 56 to guide bar 50. Heat then radiates out of guide bar 50. In the preferred embodiment, guide protrusion 56 and guide bar 50 are made of steel or other similar highly conductive material. Also preferably, guide protrusion 56 rolls freely around guide bar 50, although those skilled in the art will appreciate that protrusion 56 could be secured to guide bar 50 in a manner that does not permit it to roll.

In one alternate embodiment, guide protrusion 56 is not thermally conductive and heat sink 121 is not present to preferably transfer heat from heat sink 121 to the thermally conductive guide protrusion 56. In this embodiment, guide portion 56 and guide groove 156 perform a guiding/alignment function but do not transfer heat from portable computer 100 to docking station 20.

Figure 4:
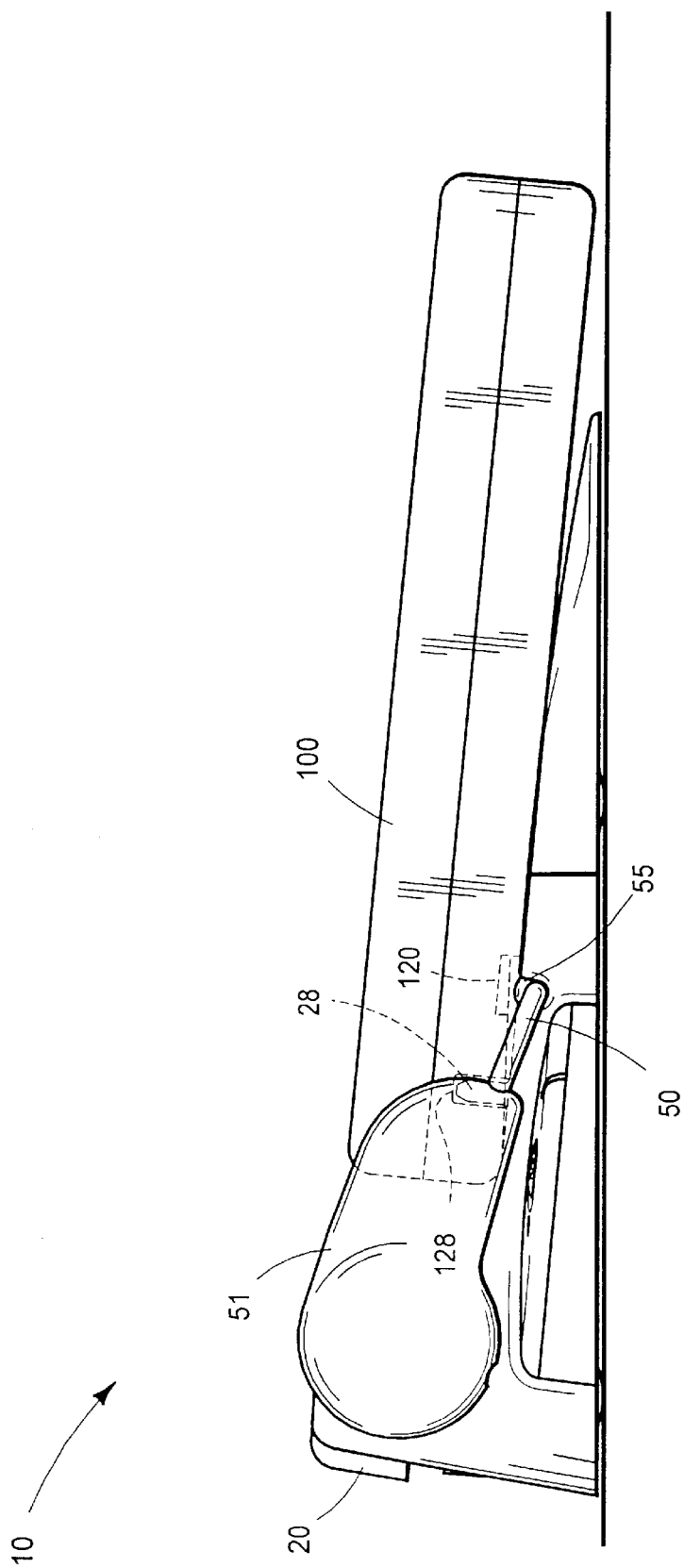
FIG. 4 shows a side view of the docking station of FIG. 1, after the portable computer and the guide bar have been pressed down into a docked position.

FIG. 4 shows a side view of computer system 10, after portable computer 100 and guide bar 50 have been pressed down into a docked position. When portable computer 100 and guide bar 50 are in a docked position, alignment pin 28 mates with alignment aperture 128, and alignment pin 29 mates with alignment aperture 129. Also, computer connector 122 mates with docking connector 22. Since docking connector 22 is operatively coupled to I/O connectors 23 (FIG. 1) docking station 20 enhances the input/output functionality of portable computer 100 when docked by providing convenient connections for portable computer 100.

Note also from FIG. 4 that when portable computer 100 is docked in docking station 20, guide protrusion 56 mates with heat sink 121 and portable computer 100. This allows heat from portable computer 100 to conduct to docking station 20 via guide protrusion 56, as has been discussed.

FIG. 5 shows the operation of guide bar 50 of docking station 20 in more detail. Guide bar 50 is connected to spring rod 81. Spring rod 81 contains one or more springs 82 secured to spring rod 81 by screw or other attachment mechanism 83, and secured to frame of docking station 20 by spring stop 84. Springs 82 serve to bias guide bar 50 in an upright, guiding position, as shown in FIGS. 1 and 3.

When portable computer 100 is placed on guide bar 50 and pressed downwardly into platform 24, springs 82 on spring rod 81 compress and resist this downward pressure. But when portable computer 100 is pressed down far enough, retention pads 58 and 59 of guide bar 50 engage with retention mechanism 31 and 32. Retention mechanism 31 and 32 holds guide bar 50 in a downward, docked position, such as that shown in FIGS. 4 and 6, thereby counteracting the upward bias on guide bar 50 via springs 82.

When the user wishes to undock portable computer 100 and release it from docking station 20, she activates lever 60. Preferably, lever 60 is activated by rotation. This action rotates lever rod 91 and moves cams 92 and 93 into sliders 94 and 95. Sliders 94 and 95 cause pins 96 and 97 to rotate downwardly. As pins 96 and 97 rotate downwardly, retention mechanism 31 and 32 rotates upwardly, pivoting on pivot points 98 and 99, respectively. When retention mechanism 31 and 32 rotates upwardly, they disengage from retention pads 58 and 59, releasing the pressure on spring 82 and causing guide bar 50 to spring into an upright, guiding position.

Another alternative embodiment has been contemplated where docking station 20 includes a security mechanism that prevents portable computer 100 from being undocked unless a key or password is provided. In this embodiment, retention mechanism 31 and 32 would not release even if lever 60 was activated, unless the key had unlocked the docking station, or a signal was received via docking connector 22 that the user provided a valid password.

Yet another alternative embodiment would prevent guide bar 50 from being retained by retention mechanism 31 and 32 unless portable computer 100 was present. This would prevent a user from manually pushing guide bar 50 down into a docked position directly with their fingers, which could become pinched by guide bar 50. Also, this would prevent guide bar 50 from snapping back up from a docked position into a guiding position when lever 60 is activated, perhaps causing minor injuries to a user if a portable computer is not resting on guide bar 50. This interlock function could be performed either by electrical means (through the verification that signals are being received from docking connector 22 before retention mechanism 31 and 32 is activated) or via mechanical means (such as one or more interlock pins pushed in by the portable computer when docked).

Figure 6:
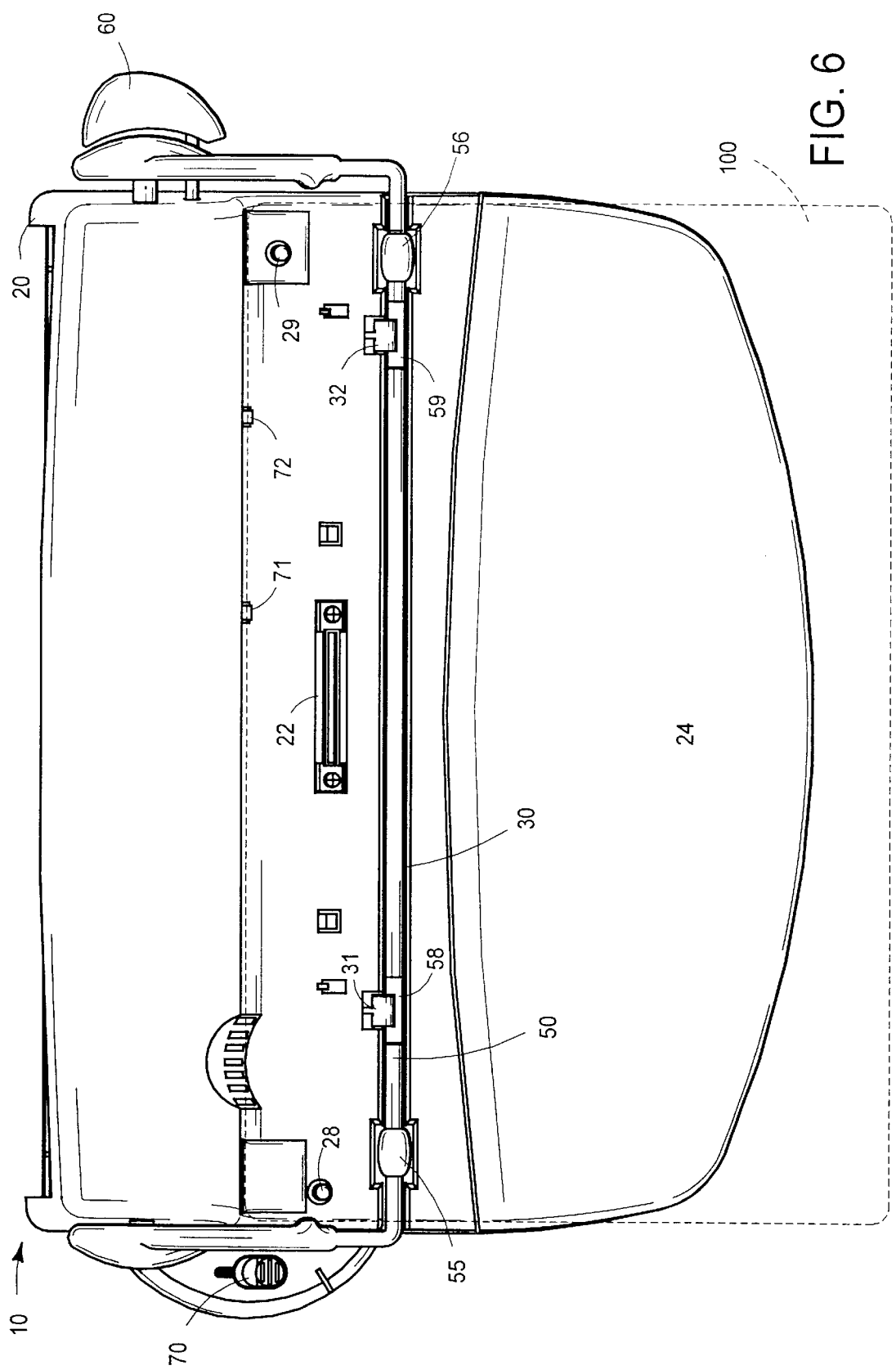
FIG. 6 shows a top view of the docking station docked with a portable computer in the preferred embodiment of the invention, where the portable computer is shown in dashed lines so as not to obscure the docking station when in a docked position.

FIG. 6 shows a top view of computer system 10, with portable computer 100 docked with docking station 20 in the preferred embodiment of the invention, where portable computer 100 is shown in dashed lines so as not to obscure docking station 20 when in a docked position. Note that retention mechanism 31 and 2 engage with retention pads 58 and 59, and that guide bar 50 rests in recessed portion 30 of platform 24.

An alternate embodiment has been contemplated where heat sink 121 (FIG. 4) is replaced or augmented by a transmitter. In this embodiment, electrical signals are transmitted from the transmitter to guide protrusion 56, and then out to guide bar 50, where guide bar 50 acts as an antenna. This allows portable computer 100 to transmit information to other electronic devices, such as other computers, cell phones, peripherals, etc., via guide bar 50. Those skilled in the art will appreciate that guide bar 58 could also serve to receive signals from such devices and provide the signals to personal computer 100 via a receiver in place of or addition to heat sink 121.

Referring now to FIG. 7, an alternate embodiment has been contemplated where guide bar 50 contains outer portion 53 and inner core 54. In this embodiment, outer portion 53 is made of a thermally conductive material, such as steel, while core 54 is made up a liquid, such as water. When outer portion 53 of guide bar 50 heats up, heat is transferred to the liquid in core 54. The liquid within core 54 moves the heat from hotter areas of guide bar 50 to cooler areas of guide bar 50. While this is preferably done naturally through convection, an embodiment has been contemplated where liquid coolant is circulated by a refrigerating, circulating mechanism, such as that found traditionally in refrigerators albeit on a much smaller scale, through guide bar 50.

What is claimed is:

1. A docking station for a portable computer, comprising:
   a platform;
   a movable guide bar extending over the platform, the guide bar having a left end portion, a right end portion, and a middle portion connected between the left end portion and the right end portion,
   the left end portion connected to a left end of the docking station and the right end portion connected to a right end of the docking station;
   the middle portion having a length and a circumference, wherein the length is substantially larger than the circumference; and
   the guide bar capable of guiding the portable computer into proper alignment with the docking station when the portable computer is placed on the guide bar and pressed downwardly into the platform.

2. The docking station of claim 1, further comprising:
   a docking connector capable of mating with a computer connector on the portable computer when the portable computer is docked with the docking station.

3. The docking station of claim 2, wherein the platform further comprises:
   an alignment pin capable of mating with an alignment aperture on the portable computer when the portable computer is docked.

4. The docking station of claim 3, wherein said guide bar is movable from a guiding position to a docked position, wherein the docking station further comprises:
   a spring mechanism for biasing the guide bar in the guiding position.

5. The docking station of claim 4, wherein the platform further comprises:
   a retention mechanism for retaining the guide bar when the guide bar is in the docked position.

6. The docking station of claim 5, further comprising:
   a lever for releasing the retention mechanism, thereby allowing the guide bar to spring back from the docked position to the guiding position.

7. The docking station of claim 1, wherein the guide bar further comprises:
   a guide protrusion capable of travelling in a recessed guide groove on the portable computer.

8. The docking station of claim 1, wherein the guide bar comprises an outer portion and a core portion, wherein the outer portion comprises a metal and the core portion comprises a liquid.

9. The docking station of claim 8, wherein the liquid is a circulating coolant.

10. A computer system comprising docking station and a portable computer, the portable computer having a computer connector, the docking station further comprising:
    a platform;
    a movable guide bar extending over the platform, the guide bar having a left end portion, a right end portion, and a middle portion connected between the left end portion an the right end portion,
    the left end portion connected to a left end of the docking station and the right end portion connected to a right end of the docking station;
    the middle portion having a length and a circumference, wherein the length is substantially larger than the circumference; and
    the guide bar for guiding the portable computer into proper alignment with the docking station when the portable computer is placed on the guide bar and pressed downwardly into the platform; and a docking connector for mating with the computer connector on the portable computer when the portable computer is docked with the docking station.

11. The docking station of claim 10, wherein the platform further comprises:

an alignment pin for mating with an alignment aperture on the portable computer when the portable computer is docked.

12. The docking station of claim 11, wherein said guide bar is movable from a guiding position to a docked position, wherein the docking station further comprises:

a spring mechanism for biasing the guide bar in the position.

13. The docking station of claim 12, wherein the platform further comprises:

a retention mechanism for retaining the guide bar when the guide bar is in the docked position.

14. The docking station of claim 13, further comprising:

a lever for releasing the retention mechanism, thereby allowing the guide bar to spring back from the docked position to the guiding position.

15. The docking station of claim 10, wherein the guide bar further comprises:

a guide protrusion for travelling in a recessed guide groove on the portable computer.

16. The docking station of claim 15, wherein the guide bar and guide protrusion are thermally conductive.

17. The docking station of claim 16, wherein the guide protrusion is for mating with a heat sink contained in the guide groove on the portable computer.

18. The docking station of claim 15, further comprising:

a grounding pin for grounding a connector on the portable computer when the portable computer is docked with the docking station.

19. A docking station for a portable computer, comprising:

a platform;

a movable guide bar extending over the platform, the guide bar having a left end portion, a right end portion, and a middle portion connected between the left end portion and the right end portion, the middle portion having a length and a circumference, wherein the length is substantially larger than the circumference; and the guide bar capable of guiding the portable computer into proper alignment with the docking station when the portable computer is placed on the guide bar and pressed downwardly into the platform.

20. The docking station of claim 19, wherein the left end portion is connected to a left end of the docking station and the right end portion is connected to a right end of the docking station.

* * * * *